(12) United States Patent
Suntola et al.

(10) Patent No.: US 6,500,780 B1
(45) Date of Patent: *Dec. 31, 2002

(54) METHOD FOR PREPARING HETEROGENEOUS CATALYSTS OF DESIRED METAL CONTENT

(75) Inventors: Tuomo Suntola, Espoo; Suvi Haukka, Helsinki; Arla Kytökivi; Eeva-Liisa Lakomaa, both of Espoo; Marina Lindblad, Helsinki; Jukka Hietala, Porvoo; Harri Hokkanen, Helsinki; Hilkka Knuuttila; Pekka Knuuttila, both of Porvoo; Outi Krause, Sipoo; Lars Peter Lindfors, Helsinki, all of (FI)

(73) Assignee: Neste Oy, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/840,274

(22) Filed: Apr. 14, 1997

Related U.S. Application Data

(63) Continuation of application No. 08/300,231, filed on Sep. 6, 1994, now abandoned, which is a continuation of application No. 07/913,724, filed on Jul. 16, 1992, now abandoned.

Foreign Application Priority Data

Jul. 16, 1991 (FI) .................................................. 913438

(51) Int. Cl.$^7$ ........................... B01J 37/02; B01J 21/06; B01J 23/26; B01J 23/30
(52) U.S. Cl. ........................ 502/319; 502/350; 502/305
(58) Field of Search .......................... 502/60, 256, 355, 502/350, 319, 305

(56) References Cited

U.S. PATENT DOCUMENTS

| | | | |
|---|---|---|---|
| 2,657,149 A | | 10/1953 | Iler |
| 2,965,686 A | | 12/1960 | Prill |
| 3,817,970 A | * | 6/1974 | Mueller-Tamm et al. ... 502/133 |
| 4,048,247 A | * | 9/1977 | Ryu ............................. 502/227 |
| 4,235,749 A | * | 11/1980 | Gens ............................ 502/174 |
| 4,356,294 A | * | 10/1982 | Rekers et al. ................ 526/100 |
| 4,459,372 A | | 7/1984 | Arena ......................... 502/351 |
| 4,670,411 A | | 6/1987 | Johnson ........................ 502/60 |
| 5,372,982 A | * | 12/1994 | Hietala et al. .............. 502/226 |

FOREIGN PATENT DOCUMENTS

| | | |
|---|---|---|
| EP | 0345856 A1 | 12/1989 |
| EP | 0438134 | 7/1991 |

OTHER PUBLICATIONS

"Preparation of Ni/Al$_2$O$_3$ catalysts from vapor phase by atomic layer epitaxy," Lindblad, et al., Catalysis Letters 27 (1994) 323–336.

"The utilization of saturated gas–solid reactions in the preparation of heterogeneous catalysts," Haukka, et al., 6th Int. Symp. on "Scientific Bases for the Preparation of Heterogeneous Catalysts," Sep. 5–8, 1994.

Iler, *The Chemistry of Silica*, John Wiley & Sons, pp.644–645 and 676–679 (1979).

Kirk–Othmer, *Encyclopedia of Chemical Technology*, 3$^{rd}$ Edition, vol. 20, John Wiley & Sons, pp. 766–781 (1982).

Kiselev et al., *Russian Journal of Physical Chemistry*, vol. 60, No. 7, pp.1019–1023 (1986).

Kol'tsov et al., *Russian Journal of Physical Chemistry*, vol. 42, No. 5, pp.630–632 (1968).

* cited by examiner

*Primary Examiner*—Steven P. Griffin
*Assistant Examiner*—Christina Ildebrando
(74) *Attorney, Agent, or Firm*—Birch, Stewart, Kolasch & Birch, LLP

(57) ABSTRACT

The present invention concerns a method for preparing heterogeneous catalysts. According to the method, preparation is carried out under such process conditions in which the bonding of compounds from the gas phase onto the surface of a support material is primarily determined by the properties of the support surface. The constituents contained in the reagent are then selectively bonded to the bonding sites of the support material surface, thus forming stable surface bonds. According to the invention, the number of surface-bond sites available for preparing a stable product with surface bonds is controlled by varying the reaction temperature and/or selecting a suitable reagent. The invention makes it possible to control the metal content of the end product at a predetermined level.

10 Claims, 3 Drawing Sheets

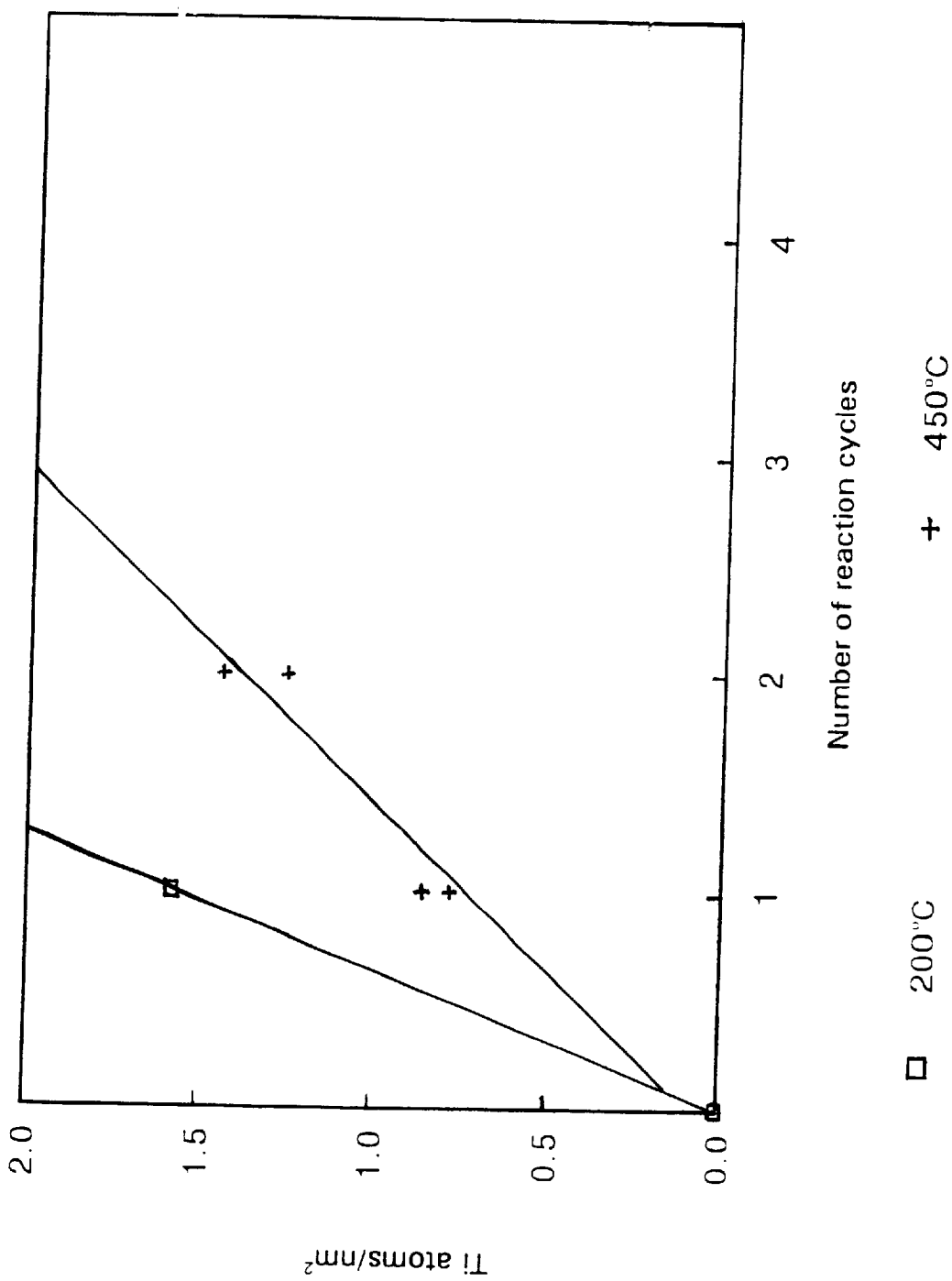
Fig. 1 Content of Ti species in $TiO_2$ layers.

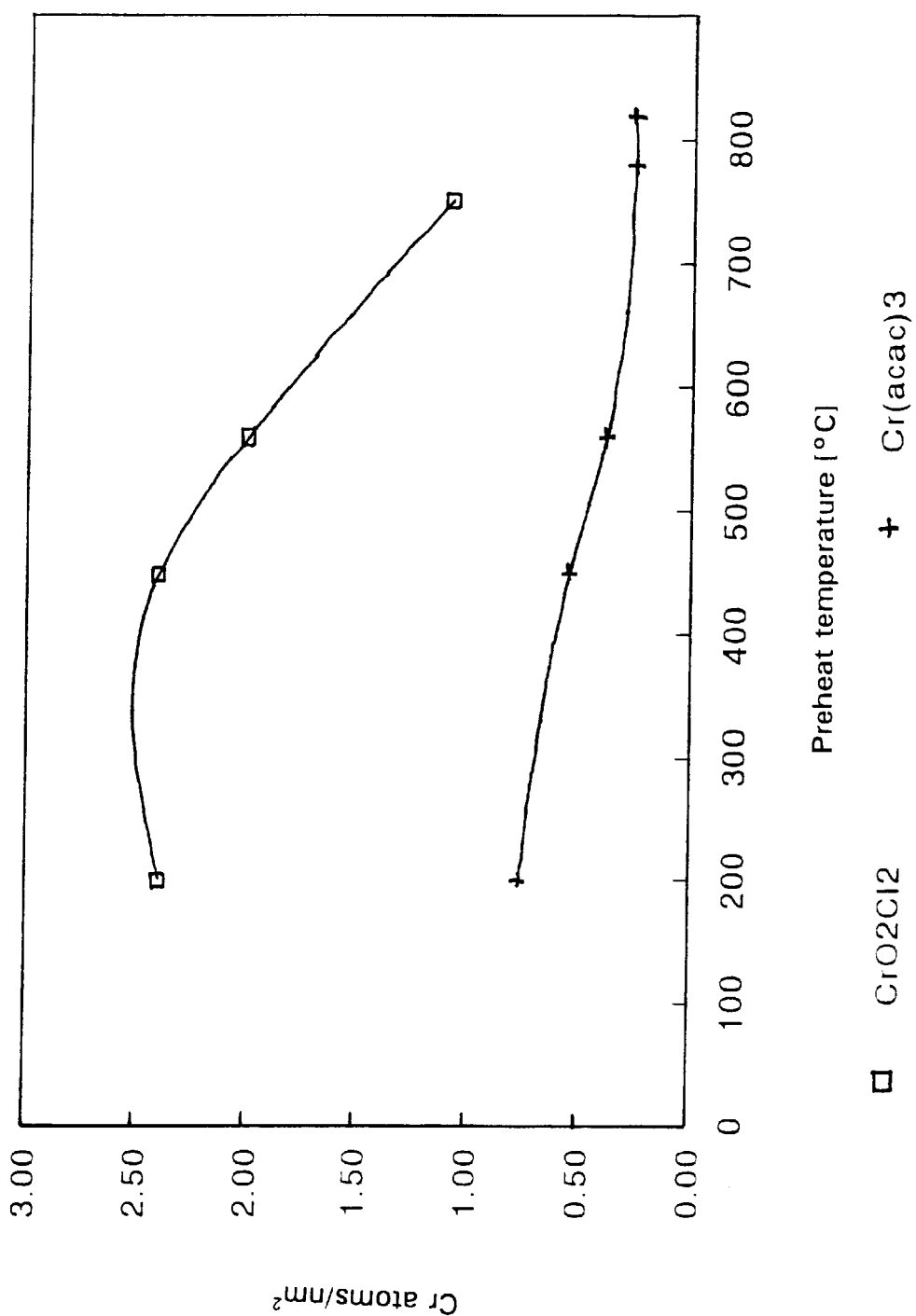
Fig. 3 Cr bonded from chromium oxychloride and acetylacetonate.

METHOD FOR PREPARING HETEROGENEOUS CATALYSTS OF DESIRED METAL CONTENT

This application is a continuation of application Ser. No. 07/913,724 filed on Jul. 16, 1992, now abandoned.

BACKGROUND OF THE INVENTION

1. Field of the Invention

The present invention relates to a method for preparing a heterogeneous catalyst comprised of a support material and at least one catalytically active species.

According to the present method, the catalytically active species or a reagent containing its precursor is transferred into a reaction space where it is reacted in vapour phase with the surface of the support material.

2. Description of the Related Arts

When preparing heterogeneous catalysts in the traditional manner, the catalytically active species are bonded to the surface of the support material using, e.g., impregnation, precipitation or ion exchange techniques. The initial reagents here are chemical compounds, generally salts, that are soluble in conventional solvents. The most common solvents used are water and alcohols.

The metal content of the catalysts being prepared is controlled in the impregnation technique by altering the metal compound concentration in the solution and using a certain precalculated volume of the solvent which is then used in toto to impregnate a porous support material.

This traditional method of catalyst preparation is hindered by the great number of different work phases required, whereby the risk of preparation errors increases. The catalyst preparation process is very sensitive to ambient conditions, thus necessitating very accurate control. Another disadvantage is related to the use of solvents. Namely, solvents can often react with the support material causing changes in its surface structure. Furthermore, solvents frequently contain impurities, which may affect the activity of the prepared catalyst. To avoid the disadvantages of liquid-phase techniques, several different gas-phase techniques have been developed in which the support materials are reacted with gas- or vapour-phase reagents containing the catalytically active species or its precursor. When using gas-phase techniques, the content of the metal compound in the final product is conventionally controlled by metering a certain amount of the gas into the reaction space.

Such gas-phase techniques known in the art achieve the control of the average concentration of the metal compound but fail in simultaneously achieving the control of the active species distribution on the support material. A frequently occurring phenomenon is the aggregation of the active species into clusters, so all molecules of the metal species cannot act as catalytically active points.

SUMMARY OF THE INVENTION

It is an object of the present invention to overcome the drawbacks of conventional technology and achieve a method suited to the preparation of heterogeneous catalysts having a desired content of the active species.

The invention is based on two basic ideas. Firstly, the method aims to achieve a situation in which the bonding of the gas-phase materials onto the support material surface is primarily determined by the properties of the support material surface. In the context of the present invention, this property is called the "surface-bond selectivity". Namely, the goal is to achieve such process conditions in which the constituents of the reagent are selectively bonded to the bonding sites available on the support material surface, thus forming permanent surface bonds. Which bonding sites under certain conditions are available for achieving a stable end product is determined by, among other factors, the surface structure of the support material, the reaction temperature and other reaction parameters, as well as the reactivity of the reagent and its bonding energy in the reaction. The principal properties of the support material surface affecting the end result are the structural geometry of the atoms in the support material surface and their electron configuration (that is, the energy potential function of the surface).

The reaction temperature and time applied in the method, as well as other similar conditions, are determined by the support material/reagent pair. Independently of the support material and the reagent, the method according to the invention is, however, characterized in that the surface-bonding selectivity is ensured by maintaining the vapour pressure of the reagent sufficiently high and the reaction time sufficiently long to keep the amount of the reagent at least to the number of surface-bond sites available at a time.

According to the present invention, through the fulfillment of the surface-bonding selectivity requirement, a homogeneous distribution of the active species is achieved by virtue of saturating surface-bond reactions. The utilization of the saturation principle of the surface-bond reactions yields a homogeneous distribution of the active species and simultaneously controls the active species content at a saturation level which is determined by the number of surface-bond sites participating in the reaction. Consequently, the second basic idea of the invention requires that the number of those surface-bond sites which, under the predetermined conditions of set temperature, introduced reagent, and chemical structure of the support material surface, are available to form a stable surface-bond reacted product must at least essentially correspond to the desired content of the catalytically active species in the catalyst being prepared. For this purpose, according to the invention, the number of surface-bond sites is predetermined through two major variables, namely, control of the reaction temperature and/or proper selection of the reagent.

DETAILED DESCRIPTION OF THE INVENTION

The invention combines the benefits of surface-bonding selectivity and reaction controllability. Hence, the invention makes it possible to achieve a heterogeneous catalyst whose activity even at a low content of the catalytic metal is as high as that of a catalyst of higher metal content prepared in a conventional manner. Moreover, the metal content of the end product can be accurately controlled at a predetermined level.

The definitions used in the context of the present invention are as follows:

Catalyst reagent refers to an initial reagent which is capable of being converted into gaseous form and then reacting on the support material surface so as to form a catalytically active site or a precursor necessary for generating such a site. The catalyst reagent can be any vapourizable or gaseous compound conventionally used in the preparation of heterogeneous catalysts. Thus, applicable reagent materials include, for example, elemental metals such as zinc, metal compounds such as rhenium oxides, metal halides such as halogenated chromium compounds, tungsten chlorides and oxychlorides, and metal complex compounds such as Cr(acac)$_3$ and Mg(thd)$_2$.

Precursor refers to such available (inactive) initial forms of the catalytically active constituent from which the active species can be obtained by means of an appropriate treatment.

Active species refers to a catalytically active component on the support material surface, whereby the active species can be in the form of, e.g.; an atom, ion, molecule, chemical compound or complex compound. Conventionally, the active species is comprised of a metal ion or atom or metal compound bonded to the support material surface.

Support material refers to a material in solid state that provides a surface of at least a relatively large area, capable of bonding the catalytically active species or its compound. The surface area of the support material determined by the BET method typically is in the range from 10 to 1000 m$^2$/g. The support material can be comprised of an inorganic oxide such as silicon oxide (silica gel), aluminium oxide, thorium oxide, zirconium oxide, magnesium oxide, or any of their mixtures. In their inherent form, these support materials are essentially inactive as catalysts. Alternatively, support materials can be employed that inherently act as catalysts in the chemical reaction to be catalyzed. Examples of such support materials are natural and synthetic zeolites. Also inactive support materials having species of a catalytically active material bonded to their surface are considered support materials within the context of the present application. Thus, when preparing bimetal catalysts, the first catalytic species bonded to the support material surface is defined to form a part of the support surface for the second catalytic species.

Reaction space refers to the space in which the support material and the reagents are interacted with each other.

It is an object of the present invention to combine selective surface bonding with the controllability of the content of the catalytically active species. An essential property of the invention is the manner of maintaining the saturation condition during the surface-bond reaction which is characteristic of the present surface-bond selective method.

The method according to the invention comprises chiefly three phases of which the pretreatment and posttreatment phases are advantageous in some embodiments of the invention, although they are not necessary for the implementation of the basic principle of the invention.

To attain the reaction conditions favourable for the selective surface-bond reaction, all reagents necessary for the pretreatment, the bonding of the catalytically active species, and the posttreatment are introduced into the reaction space in gaseous form, typically one reagent at a time. The vapour pressure of the vapourized catalyst reagent is then maintained sufficiently high and the interaction time of the reaction with the support material surface sufficiently long so that the amount of available reagent is at least as high, or preferably in excess of the amount required to saturate the number of surface-bond sites available on the support material. The excess ratio of the reagent quantity employed to the atomic or molecular layer (known as monolayer) quantity which is necessary for filling all available bonding sites on the substrate material surface is typically in the range from 1 to 100, preferably 1 to 2. The reagent quantity corresponding to the monolayer bonding situation can be computed on the basis of the surface area of the supporting material determined with the help of, e.g., the BET method, and the molecular structure of the surface.

According to the invention, the reaction conditions are created such that the active species of the gas-phase reagent during the reaction with the support material surface can fill absolutely all or essentially all available bonding sites, whereby the saturation of the support material surface is attained at the set reaction temperature.

To prevent condensation of the reagent, the reaction temperature must not be allowed to fall essentially below the temperature necessary for vapourization of the reagent. Condensation of the reagent during its transfer to the reaction space must also be prevented. The initial reagent, its vapour temperature and the temperature used in the reaction must be selected so that decomposition of the initial reagent and possible condensation of decomposition products are prevented.

Experimental methods can be applied to determine the temperature window, or the temperature span, in which the reaction is advantageously carried out. The lower limit of such span is determined by the condensation temperature of the reagent to be vapourized and the activation energy necessary to attain a desired activation energy to establish a bond to the surface-bond site. This is because the condensation temperature of the catalyst reagent cannot be taken as the lower limit temperature for the bonding reaction if said temperature is too low for imparting to the reagent a sufficient energy to exceed the activation energy. The upper temperature limit is the lower of the following two temperatures: The decomposition temperature of the reagent or the temperature at which the constituent chemisorbed on the support material or its precursor starts to desorb in an essential amount from the advantageous bonding sites. The reagent is selected so that the activation energy necessary for chemisorption is exceeded at a temperature at which desorption from the advantageous bonding sites still remains insignificant. Because the activation and desorption energies are not generally known, the selection of the proper reagent and temperature must be performed experimentally.

The reaction between the vapour of the catalyst reagent and the support material can be carried out at elevated pressure, ambient pressure or partial vacuum. According to a preferred embodiment of the invention, the preparation takes place at a pressure ranging from 0.1 to 100 mbar. An advantage of the partial vacuum is that purity of the reaction space can be improved and the diffusion rate increased. Another preferred approach is to operate at ambient pressure. This permits the use of less complicated equipment. The preparation at ambient pressure is advantageous when the reagent under the reaction conditions has a partial pressure approximating the ambient pressure, preferably greater than 100 mbar.

The reaction time is principally affected by the diffusion of gas molecules into the pores of the support material. Diffusion of gas between the particles of the support material is rapid in comparison with the diffusion into the pores. The reaction time is selected so long as to permit a sufficiently effective interaction of the gas containing the active component of the reagent with the bonding sites of the support material and to achieve saturation of the support material surface. In the tests performed, a reaction time of 0.1 to 10 h, typically 0.5 to 2 h, was found sufficient to achieve this situation when treating support material quantities of 1 to 20 g.

In a preferred embodiment, an inert gas is conducted through a static support material column at a flow rate which remains appreciably smaller than the thermal diffusion rate of the reagent. In particular, the carrier gas flow rate is adjusted so as to be essentially equal to the diffusion rate of the reagent into the pores of the support material under the reaction conditions. This is because the saturation principle permits the use of a low flow rate that assures effective interaction between the reagent and the support material surface. Thence, the individual molecules of the reagent gas can make a plurality of impacts on the surface, which further results in an effective saturation of the bonding sites of the support material without causing a significant macroscopic oversaturation. The typical carrier gas flow rate in this embodiment is approx. 10 cm/min. The verification of the saturation condition can be performed by determination of the active species or precursor content in that part of the ready-made end product which during the reaction has been in the upper part of the support material column (that is, the carrier gas inlet end), and correspondingly, at the lower end of the column (that is, the exit end). If these two contents are equal, saturation conditions have been attained.

A pretreatment is applied to produce a predetermined number of desired bonding sites for the catalytically active species to be bonded. The pretreatment can be performed using a thermal treatment or a chemical treatment or a combination of both.

To optimize the properties of the catalyst, it can be subjected to a posttreatment if desired. This can be implemented using, e.g., a thermal treatment in which the catalyst is heated to a desired temperature which generally is slightly higher than that of the bonding reaction. When the degree of oxidization at the catalytically active point is desired to be altered, the thermal treatment is carried out in oxidizing, or alternatively, reducing conditions. The posttreatment process can also be employed to interact the prepared catalyst with a vapour, e.g., water vapour, which can affect the bonding environment of the active species or a precursor already bonded to the support material surface.

The content of the active species bonded by chemisorption is controlled according to the invention within the scope of the surface-bond selective method via the control of the saturation level, which can be implemented by varying, e.g.:

the reaction conditions (A), the surface (B) participating in the surface-bond reaction, and the reagent (C) introduced in gas phase.

The saturation level attained in the surface-bond reaction is determined by the combined effect of these three partial factors.

The basic control means are provided by the reaction conditions A. The most important control parameter of the reaction conditions is the reaction temperature. The variation limits of the reaction temperature and the effect of their variation is essentially dependent on the surface B and the reagent C participating in the surface-bond reaction. Each combination of B and C is related to a specific temperature window and control range of active species content.

The variation limits of the reaction temperature (temperature window) are set by the requirement of maintaining the saturation conditions. The reaction temperature offers a means for controlling the saturation level if bonding sites of different activation energies or different bonding energies for the reagent C are available on the surface B. If the surface provides bonding sites of a single type only (that is, of identical activation energy and identical bonding energy) for the reagent, the saturation level is independent of the reaction temperature within the temperature window allowable for the reaction.

If the surface has bonding sites of two different activation energy levels $E_a1$ and $E_a2$ ($E_a1<E_a2$) for the reagent, it is possible to find within the reaction's temperature window a threshold temperature (or a temperature span of change) below which bonding sites having the activation energy level $E_a1$ only are filled, while when the temperature is increased above said temperature, bonds are formed to the sites of both activation energy levels $E_a1$ and $E_a2$. Then, the reaction temperature can be employed to select between two different levels of saturation.

If the surface has bonding sites of two different bonding energy levels $E_s1$ and $E_s2$ ($E_s1<E_s2$) for the reagent, it is possible to find within the temperature window of the reaction a threshold temperature (or a temperature span of change) below which bonds formed to the sites of both bonding energy levels $E_s1$ and $E_s2$ are retained, and above which only bonds having the bonding energy $E_s1$ are retained. Also in this case the reaction temperature can be employed to select between two different levels of saturation.

The levels of both the activation energy $E_a$ and the bonding energies $E_s$ can be a distributed function of energy levels, whereby the surface B provides the reagent such bonding sites whose activation energies are distributed over the range from $E_a(min)$ to $E_a(max)$ and whose bonding energy is distributed over the range from $E_s(min)$ to $E_s(max)$.

In the case of a distributed function of activation or bonding energy, the reaction temperature can be utilized for controlling the saturation level within the limits determined by the distributed energy functions.

On the basis of the above-discussed grounds, an advantageous embodiment of the invention is characterized in that the reaction temperature is set to a level at which the reagent introduced into the reaction space reacts so as to form a stable bond to the bonding site with only a portion of all those bonding sites which are in principle available within the temperature span confined by the upper and lower temperature limits. Advantageously, the temperature is set to a level at which the reagent introduced into the reaction space reacts with bonding sites having at least two different activation energies.

According to another preferred embodiment of the invention, the temperature is set to a level at which the reagent introduced into the reaction space reacts with bonding sites having mutually identical activation energies.

As noted in the general part of the description above, the number of surface-bond sites participating in the reaction which forms the stable end product is affected, besides by the control of the reaction temperature, also by the type of reagent selected. Consequently, according to a preferred embodiment of the invention, the reagent is selected such that the reagent introduced into the reaction space reacts with only a portion of the bonding sites available at the set reaction temperature, whereby a stable reaction product is formed with the reagent. To accomplish this, a reagent is selected, for instance, that reacts with chemically identical surface-bond sites only. One kind of these reagents are those that can react solely with the hydroxyl groups of the surface such as chromyl halides. According to another alternative embodiment, a reagent of large molecular size is selected whose molecules do not fit to bond to adjacent sites. Bonded to the surface, such a molecule will block the adjacent bonding sites of the surface thus preventing other molecules from bonding to said sites.

The invention is next examined in detail with the help of a detailed description and working examples. It must be noted that the description given below illustrates only a few preferred embodiments of the invention. Without departing from the scope and spirit of the invention, however, embodiments differing in their details from those described below are possible.

FIG. 1 shows the titanium content of Ti/alumina catalysts as a function of reaction cycles when the number of bonding sites on the support material surface are varied by repeated surface-bond reactions.

FIG. 3 shows the amount of chromium bonded to silica gel from different chromium reagents as a function of temperature.

Figure 2B:
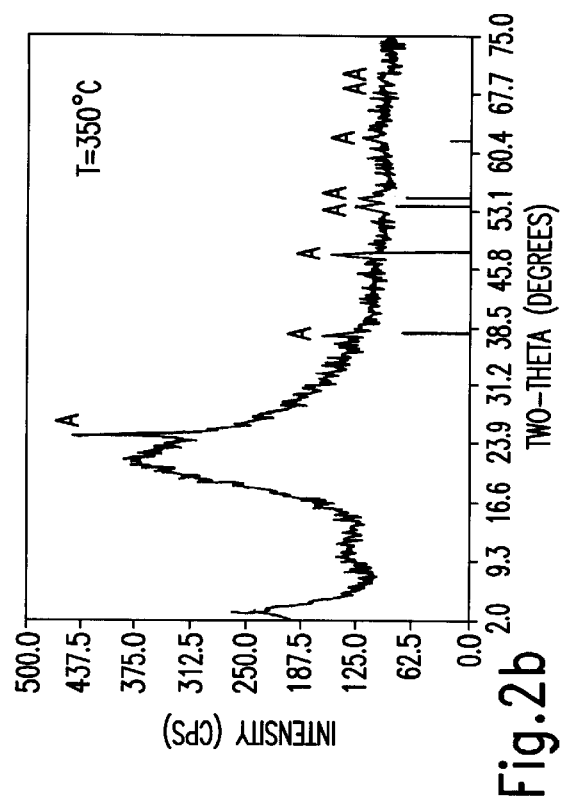
FIGS. 2a to 2d show the structures determined by XRD of Ti/alumina catalysts prepared at four different temperatures.

Complementing the text above, an overview is given for the different control methods that can be employed in the reaction to attain a desired content of the active metal species in a catalyst prepared using the surface-bond selective method. The same control methods can also be utilized to change the concentration of additives or ligands used for modifying the properties of the catalytically active point.

A: The reaction temperature can be altered so as to attain desired conditions for bonding to the surface sites.

B: The surface properties can be modified by:
an inhibiting reagent which deactivates a portion of the available bonding sites,
a reagent which increases the number of available bonding sites, and
a repeated sequence of surface-bond reactions which alter the chemical properties of the support material surface.

C: The reagent properties can be affected by:
the selection of reagent molecules of different chemical properties, and
the selection of reagent molecules of different size.

A. Reaction Temperature:

The potential energy of the support material bonding sites varies according to the bonding site and its immediate surroundings. The metal compound introduced into the reaction space in gaseous form requires a certain energy to form a chemical bond with the desired bonding site. Elevation of the reaction temperature increases the available energy, whereby bonds of higher bonding energy can be formed. When the temperature is increased, also the desorption rate of the metal species from the support material surface begins to increase. Thus, a temperature window can be determined by experimental methods for a bonding reaction, whereby the lower temperature limit is set by the condensation temperature of the metal compound and/or the temperature necessary to exceed the reaction energy threshold and the upper temperature limit is set by either the decomposition temperature of the reagent or the temperature at which significant desorption of the reagent species starts to occur.

Further possibilities within this temperature window are available through selective steering of the bonding of the metal compound to all available bonding sites, or alternatively, only to sites which exhibit a bonding energy above a certain threshold or an activation energy remaining below a certain threshold.

As an example, the bonding of $TiCl_4$ to a silica support at different temperatures is described (Example 1).

B1. Use of Inhibiting Reagent:

The bonding sites can be selectively filled using an inert molecule species with respect to the catalyst bonding reaction such that is capable of deactivating bonding sites of a certain energy. Then, the molecule to be reacted has less bonding sites available, whereby the metal content of the catalyst is reduced. After the metal compound has been reacted, the inhibiting reagent can be removed or chemically converted to a different form if its presence could disturb the reaction to be catalyzed, or alternatively, the bonding sites can be filled with another catalytically active metal species if desired.

As an example, the use of hexamethyldisilazane as the inhibiting reagent prior to the bonding of chromium acetylacetonate on silica support is described (Example 2).

B2. Use of Enhancing Reagent for Increasing the Number of Bonding Sites:

The number of bonding sites can also be enhanced by chemical means using an appropriate reagent. Such a reagent can be, e.g., water vapour which is reacted with the support material surface at a certain temperature. In this reaction the surface attains a stabilized density of OH groups determined by the temperature used and the properties of the surface. If, during the preparation of a bimetal catalyst, for example, the content of the first metal to be reacted with the surface is desired to be affected, the number of bonding sites containing OH groups or other binding sites is reduced by thermal treatment, and then the first metal compound is introduced. Next, the surface is subjected to treatment by water vapour, and new OH group serving as bonding sites for the second metal compound will be created. The number of OH groups created depends on the water vapour treatment temperature.

Also, it will be possible to get more of the second metal bonded to the surface if, by removing the ligand of the first metal compound, the bonding sites which were in the "shadow" of the ligand tail become available.

Essentially, the example also includes another method for increasing the number of bonding sites containing OH groups. If the first compound reacted with the surface is a metal halide, the halide ions are replaced by OH groups during the water vapour treatment, with a simultaneous release of hydrogen halides. Thus, new bonding sites are created for bonding the second reagent containing a metal compound.

B3. Modification of Support Material Surface by Repeated Surface-bond Reactions:

The number of bonding sites available on the support material surface can be affected by varying the chemical properties of the surface by way of repeated surface-bond reactions prior to the bonding of the actual catalytically active reagent. This modification process requires alternating repetition of at least two different surface-bond reaction cycles performed once or several times in such a manner that saturation of the surface is attained during each reaction cycle.

Typically, one of the reactions is such that occurs between the metal-containing reagent and the surface. Following this reaction, a single or multiple reaction steps can be carried out in order to remove possible extra groups from the reagent chemically bonded to the surface or to create new bonding sites for the following process steps. New bonding sites can be created when, for instance, ligands are removed from the bonded reagent, whereby those bonding sites of the original surface that were shadowed by the ligands are revealed. New bonding sites can also be created in an exchange reaction between the bonded reagent and the reagent of the next process step, whereby the alternation of the reaction steps can form a compound such as oxide or nitride, for instance. The crystalline configuration of the formed compound can in certain cases be affected by selective choice of the bonding sites on the unbonded support material surface (through pretreatment) and control of reaction temperature so as to favour certain types of reactions. Thus, for instance, if $TiCl_4$ vapours are reacted with a silica support at temperatures below approx. 250° C., an amorphous structure will be obtained, whereas temperatures in the range from 350° C. to 550° C. will give rise to catalysts with anatase $TiO_2$, anatase and rutile $TiO_2$, and rutile $TiO_2$ surface structures, respectively. The properties of the catalysts vary to some extent depending on the crystallinity of the catalysts, the amorphous structure being preferred for some applications.

As examples of the surface modification process prior to the reaction of the actual reagent, the deposition of aluminium oxide (Example 3) and titanium oxide (Example 4) onto silica support is described.

C1. Different Types of Reagent Molecules:

Molecules exhibiting different chemical properties in their reactions yield different contents of the catalytically active metal.

For instance, chromyl chloride ($CrO_2Cl_2$) and chromium acetylacetonate ($Cr(acac)_3$) bond to different bonding sites. Chromyl chloride reacts with the hydroxyl groups of the surface, whereby 1 or 2 HCl molecules per bonded Cr atom are released. By contrast, $Cr(acac)_3$ reacts with bonding sites containing hydrogen-bonded groups, whereby one of the three ligands is detached. Using chromyl chloride, the Cr content on silica support can be varied in the range from 1.8 to 5 wt %, and using chromium acetylacetonate, in the range 0.6 to 2.4 wt % when preheating of the silica support is carried out in a temperature range from 820° C. to 200° C., respectively.

The $WOCl_4$ and $WCl_6$ molecules have approximately equal size, yet their bonding to surface-bond sites is different. An example of this is the bonding of tungsten onto alumina from $WOCl_4$ and $WCl_6$. The reaction takes place with the hydroxyl groups of the surface in the form of an exchange reaction, whereby 1 or 2 HCl molecules are released per each bonded W-species molecule.

The above-discussed reactions are illustrated in Examples 5 and 6.

C2. Size of Reagent Molecule:

Besides the chemical properties of a molecule, its size can affect the saturation level. Metal compounds of different molecular size give a possibility of controlling the mutual distance of the catalytically active species. Increase of the molecular size permits the outdistancing of the metal atoms, because the condensation of a metal compound onto an already bonded compound under saturation conditions at a sufficiently high reaction temperature cannot occur (refer to Example 7). Example 7 is a partial extension of Example 5. On reason for the different saturation level behaviour obviously is, besides the differences in the chemical properties, the difference in the molecular sizes, because the relative proportions of hydroxyl groups and hydrogen-bonded groups at the 450° C. reaction temperature of the example on the support material surface are approximately equal.

EXAMPLE 1

Effect of Reaction Temperature $SiO_2$ was pretreated for 16 h at 450° C. in air atmosphere and for 4 h in nitrogen at 70 mbar pressure. The silica support (7 g) was heated in nitrogen at 70 mbar pressure up to the reaction temperature which was 175° C., or alternatively, 450° C. $TiCl_4$ vapour was introduced for 2 h into the reaction space using nitrogen gas as carrier. The silica support was flushed with nitrogen gas for 2 h at the reaction temperature and cooled. The Ti content on the silica support was determined. The Ti contents were 3.3 wt % subsequent to the reaction at 175° C. and 2.6 wt % subsequent to the reaction at 450° C. Also the Cl/Ti ratio changed from 2.8 to 2 when the reaction temperature was elevated from 175° C. to 450° C. This indicates that the bonding of $TiCl_4$ to two OH groups is enhanced at the higher reaction temperature. At 175° C., a major portion of the $TiCl_4$ bonds to one OH group.

EXAMPLE 2

Utilization of Inhibiting Reagent $SiO_2$ was heated for 16 h at 820° C. in air atmosphere and for 4 h at 450° C. in a partial vacuum flushed with nitrogen gas. The temperature was lowered to 175° C. Vapourized hexamethyldisilazane at 50° C. temperature was introduced into the reaction space and reacted at 175° C. with the silica support. The excess reagent was flushed with nitrogen gas at 175° C. The temperature was elevated to 200° C. and $Cr(acac)_3$ was reacted for 3 h with the silica support treated in the above described manner. The silica support was finally flushed with nitrogen at 200° C.

A reference sample was prepared by bonding chromium from $Cr(acac)_3$ alone under the same conditions as above. The chromium content of the reference sample was 0.65 wt %, while in the sample treated with the hexamethyldisilazane, the corresponding content was only 0.08 wt %.

EXAMPLE 3

Surface Modification by Repeated Sequence of Surface-bond Reactions

Layers of $Al_2O_3$ can be grown on silica by flushing the pretreated silica support alternatingly with $AlCl_3$ and $H_2O$, both in vapour phase. The reaction can be carried out over a wide temperature range, whereby the growth rate of $Al_2O_3$ is dependent on the reaction temperature. When $Al_2O_3$ was deposited on silica at 200° C., the use of 1, 2 and 3 reaction cycles increased the Al concentration to 0.58, 1.0, and 1.7% by weight after the first, second and third reaction cycles, respectively. When using 420° C. reaction temperature, the following Al concentrations were obtained after 1, 2, 3, 4 and 6 reaction cycles: 0.31, 0.66, 1.0, 1.3 and 2.0% by weight.

EXAMPLE 4

Surface Modification by Repeated Surface-bond Reaction Cycles

An oxide layer similar to $Al_2O_3$ can be grown on pretreated silica using $TiCl_4$ and $H_2O$, both introduced alternately in vapour phase. Here also, the growth rate is dependent on the reaction temperature.

FIG. 1 illustrates the Ti content when the $TiO_2$ is grown using 1 and 2 reaction cycles at 200° C. and 450° C.

Furthermore, the structure of $TiO_2$ thus grown can be altered by changing the reaction temperature.

Figure 2A:
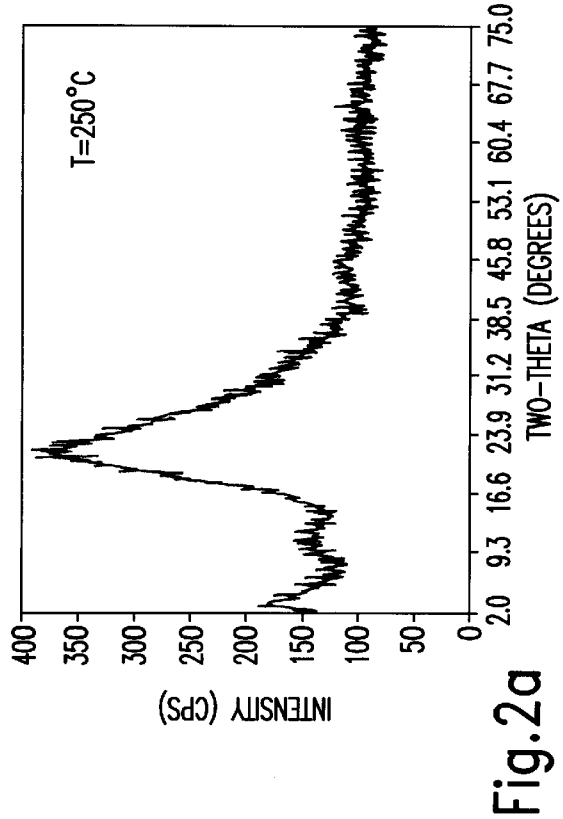
Figure 2D:
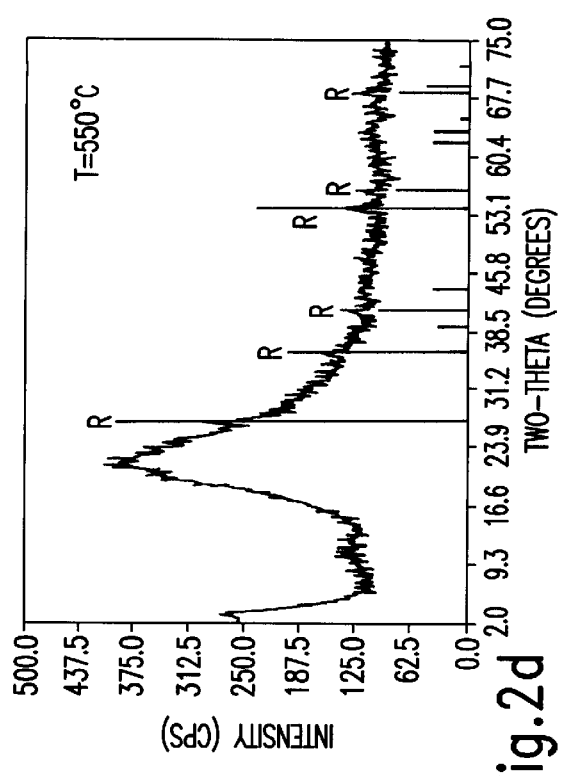
Figure 2C:
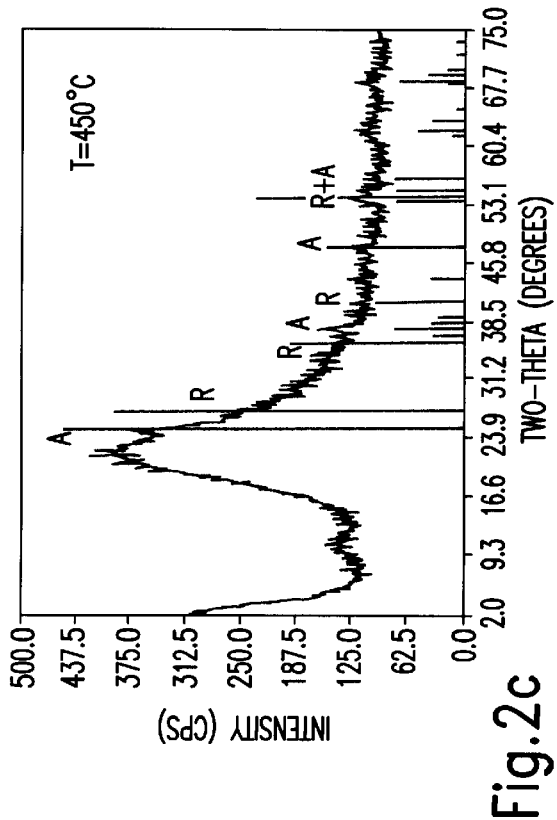

Thus, silica carriers were pretreated for 16 h at 560° C. in air and for 4 hours in vacuo at a temperature corresponding to the reaction temperature in a nitrogen atomsphere. After the pretreatment, $TiCl_4$ vapours were reacted with silica at four different temperatures, viz., 250° C., 350° C., 450° C. and 550° C., the reaction time being 2 hours. Finally, the samples were flushed with a stream of nitrogen at the reaction temperature. The Ti contents of the samples were determined, as were the structure of the samples by XRD. The XRD analysis results are depicted in FIGS. 2a to 2d. The figures show that a change of reaction temperature from 250° C. to 550° C. had a clear impact on the structure of the catalysts, a transition from an amorphous surface structure via an anatase $TiO_2$ surface structure at 350° C., a mixed anatase+rutile $Tio_2$ surface structure at 450° C. to a rutile $TiO_2$ surface structure at 550° C. being noticeable. In the figures, the anatase phase has been designated the letter A and rutile the letter R.

EXAMPLE 5

Use of Reagents Exhibiting Differing Chemical Properties

A set of $SiO_2$ support material samples were pretreated at different temperatures for 16 h in air atmosphere and further for 4 h in 70 mbar vacuum at either the pretreatment temperature or at 450° C. when the pretreatment had been carried out at 450 to 820° C. Approx. 7 g of $SiO_2$ was heated in nitrogen gas atmosphere to the reaction temperature which was 220° C. Chromyl chloride was reacted for 3 h with the silica, after which the silica was flushed with nitrogen gas at the same temperature. In another set of samples the reagent was vapourized $Cr(acac)_3$ which was reacted for 3 h with the silica. The chromium contents were determined for both sets of samples. These contents as a function of pretreatment temperature are illustrated in FIG. 2. The chromium contents can be varied as a function of temperature, but the attained saturation level varies according to the different reagents used.

EXAMPLE 6

Use of Reagents Exhibiting Different Chemical Properties $Al_2O_3$ (Grace, surface area 280 $m^2/g$, particle size 0.5 to 1.0 mm) was heated for 16 h at 420° C. in air atmosphere and for 3 h in a partial vacuum flushed with nitrogen gas. Vapourized $WCl_6$ was reacted with aluminium oxide for 4 h at 420° C. A corresponding reference sample was prepared using $WOCl_4$ as the reagent. The W species content in both samples was determined and the saturation level was measured as 2.3 wt % when using $WCl_6$ as the reagent and 3.6 wt % when using $WOCl_4$ as the reagent. The different levels of saturation can plausibly be attributed to the different chemical properties of the reagents used.

EXAMPLE 7

Use of Reagents of Different Molecular Sizes $SiO_2$ was heated for 126 h at 450° C. in air atmosphere and for 4 h in vacuum (nitrogen gas atmosphere). Chromyl chloride was reacted at 200° C. with the silica, after which the saturation level of Cr was determined to be 3.7 wt %, or 1.4 Cr atoms per $nm^2$. Chromium acetyl-acetonate reacted at 200° C. with similarly pretreated silica yielded a saturation level of 1.4 wt %, or 0.54 Cr atoms per $nm^2$. Thence, the use of chromyl chloride yields a 2.6-fold content of Cr over chromium acetylacetonate. The surface ratio of chromyl chloride molecules to chromium acetylacetonate molecules is 1:3.6.

What is claimed is:

1. A method for preparing a heterogeneous catalyst comprised of a porous support material and a predetermined amount of at least one catalytically active species by reacting a vaporous reagent that contains a catalytically active species or a precursor thereof in a reaction space with a support material surface, which comprises the following steps:

(A) modifying the surface of said support material by:
      (i) altering the number of surface-bond sites available on said support material by treating the surface with an inhibiting reagent which deactivates at least a portion of the bonding sites on the surface of said support material, or
      (ii) increasing the number of surface bond-sites available on said support material surface by chemically treating the surface with a reagent, or
      (iii) carrying out a repeating cycling of surface bond reactions;

(B) introducing said vaporous reagent and an inert gas through a static column of support material, wherein said inert gas is introduced at a flow rate less than or equal to the thermal diffusion rate of said vaporous reagent into pores of said support material at the temperature and pressure of the static column, and wherein the quantity of molecules of said catalytically active species is in excess of the number of available surface bonding sites in said support material;

(C) contacting said vaporous reagent and said support for a sufficient time at a sufficient vapor pressure that the quantity of molecules of said catalytically active species or precursor thereof interacting with said support material surface is at least as large as the quantity of said surface-bond sites available on said support material, and that essentially all of said available surface-bonded sites react with said molecules, forming a substantially uniform layer of said catalytically active species on said support material surface, resulting in a saturation of the surface-bond sites; and (D) verifying the saturation condition of the surface-bond sites being performed by determining the active species ot precursor content in a part of a ready-made end product which during the reaction step (c) has been in the carrier gas inlet end, and correspondingly, at the exit end.

2. The method according to claim 1, further comprising;
   (E) thermally treating said heterogeneous catalyst at a temperature slightly higher than the temperature of the bonding reaction, in an oxidizing or reducing atmosphere, or in the presence of water vapor.

3. The method according to claim 2, wherein said step (E) occurs prior to step (D), and steps (A), (B), (C), and (E) occur substantially simultaneously.

4. The method according to claim 1, wherein steps (A), (B), and (C) occur substantially simultaneously.

5. The method according to claim 1, wherein said step (A) comprises selecting said vaporous reagent capable of reacting with only a portion of the surface bond sites available at that temperature, or when bonded is capable of blocking reaction with adjacent bonding sites.

6. The method according to claim 1, wherein said step (A) comprises modifying the surface of said support material by (i) altering the number of surface-bond sites available on said support material by treating the surface with an inhibiting reagent which deactivates at least a portion of the bonding sites on the surface of said support material.

7. The method according to claim 6, wherein said inhibiting reagent is hexamethyldisilazane.

8. The method according to claim 1, wherein said step (A) comprises modifying the surface of said support material by (ii) increasing the number of surface bond-sites available on said support material surface by chemically treating the surface with a reagent.

9. The method according to claim 8, wherein said reagent used to increase the number of surface bond-sites available is water vapor.

10. The method according to claim 1, wherein said step (A) comprises modifying the surface of said support material by (iii) carrying out a repeating cycling of surface-bond reactions.

* * * * *